(No Model.) 5 Sheets—Sheet 2.

W. D. YEAGER.
STEAM ROAD WORKER.

No. 321,778. Patented July 7, 1885.

WITNESSES:
Fred. G. Dieterich
Geo. E. Frick

INVENTOR.
William D. Yeager
By Louis Bagger & Co.
ATTORNEYS.

(No Model.) 5 Sheets—Sheet 3.

W. D. YEAGER.
STEAM ROAD WORKER.

No. 321,778. Patented July 7, 1885.

WITNESSES:
Fred. G. Dieterich.
Geo. E. Frick.

INVENTOR.
William D. Yeager
By Louis Bagger & Co.
ATTORNEYS.

(No Model.) 5 Sheets—Sheet 4.
W. D. YEAGER.
STEAM ROAD WORKER.
No. 321,778. Patented July 7, 1885.
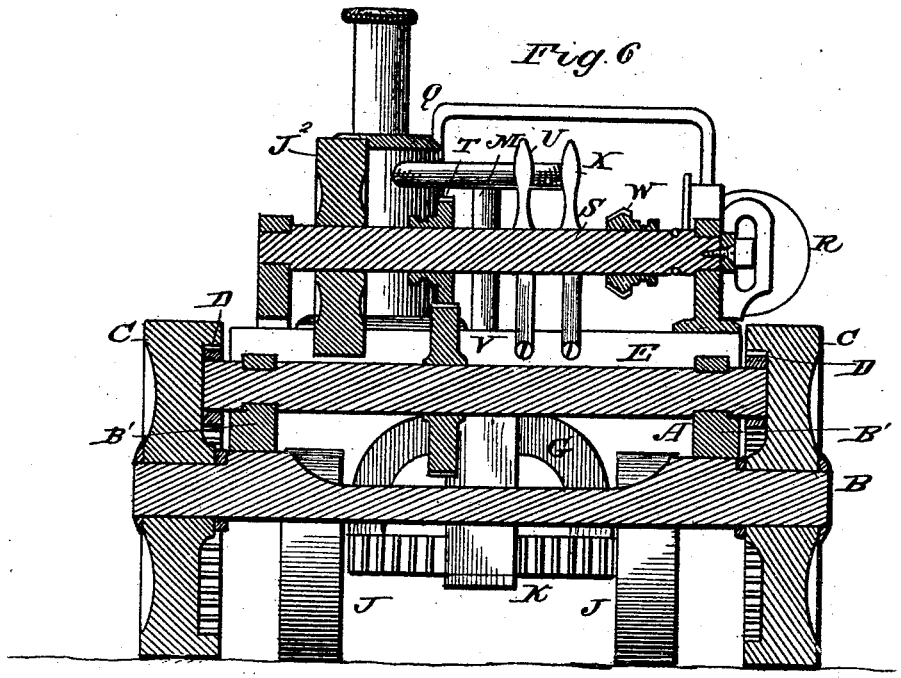
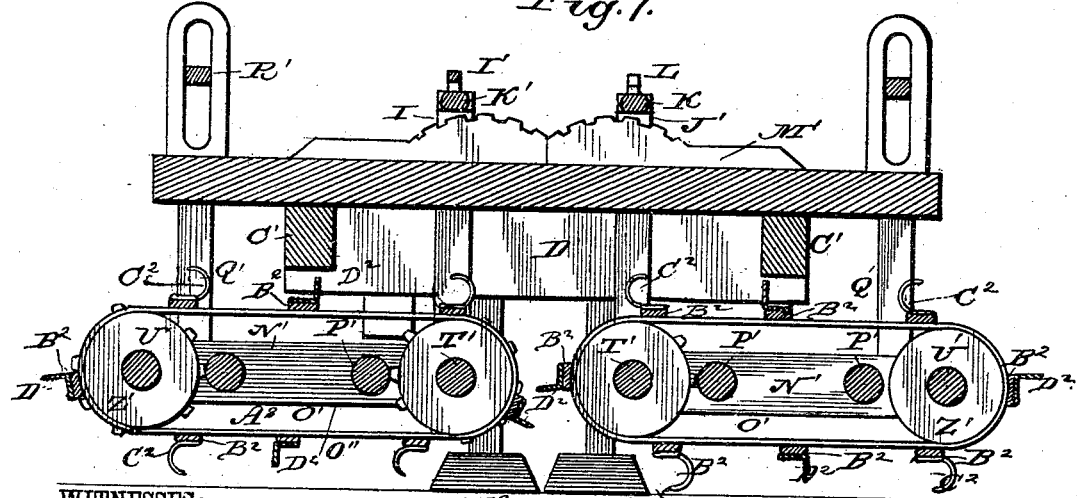
WITNESSES:
Fred G. Dieterich
Geo. E. Frieh
INVENTOR.
William D. Yeager,
By Louis Bagger & Co.,
ATTORNEYS.

(No Model.) 5 Sheets—Sheet 5.

W. D. YEAGER.
STEAM ROAD WORKER.

No. 321,778. Patented July 7, 1885.

WITNESSES:
Fred. G. Dieterich.
Geo. E. Frech.

INVENTOR,
William D. Yeager
By Louis Bagger & Co.
ATTORNEYS.

UNITED STATES PATENT OFFICE.

WILLIAM DAWSON YEAGER, OF DOUGLASVILLE, GEORGIA.

STEAM ROAD-WORKER.

SPECIFICATION forming part of Letters Patent No. 321,778, dated July 7, 1885.

Application filed September 29, 1884. (No model.)

*To all whom it may concern:*

Be it known that I, WILLIAM D. YEAGER, a citizen of the United States, and a resident of Douglasville, in the county of Douglas and State of Georgia, have invented certain new and useful Improvements in Steam Road-Workers; and I do hereby declare that the following is a full, clear, and exact description of the invention, which will enable others skilled in the art to which it appertains to make and use the same, reference being had to the accompanying drawings, which form a part of this specification, and in which—

Figure 1:
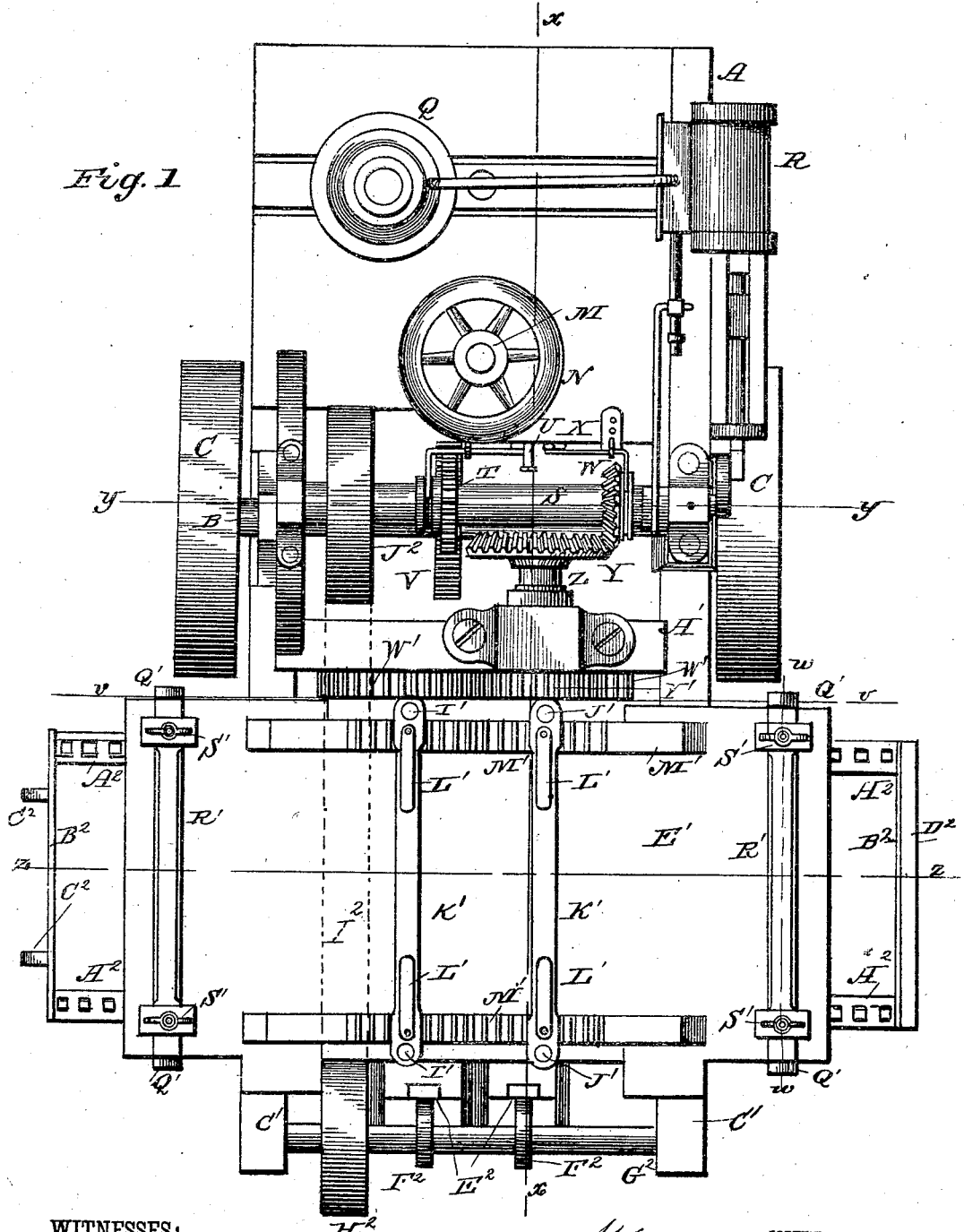
Figure 2:
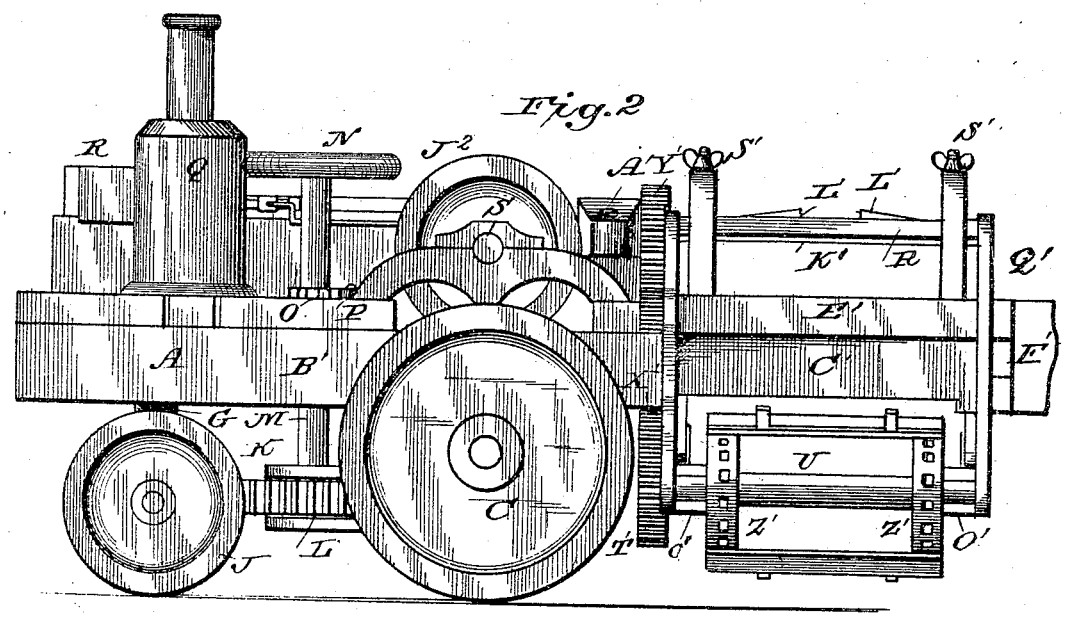
Figure 3:
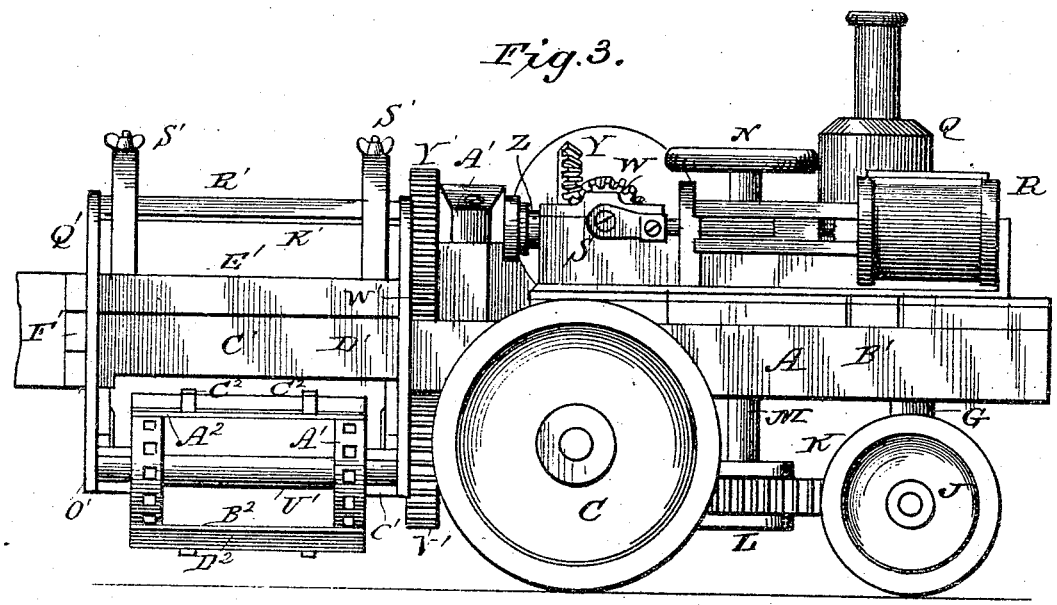
Figure 4:
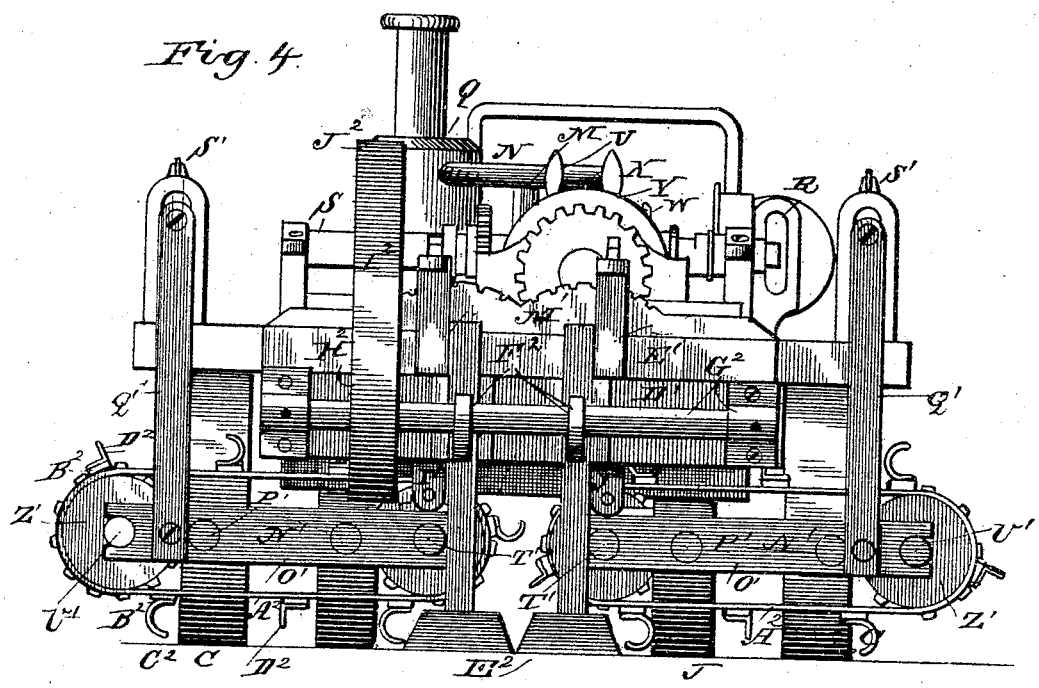
Figure 5:
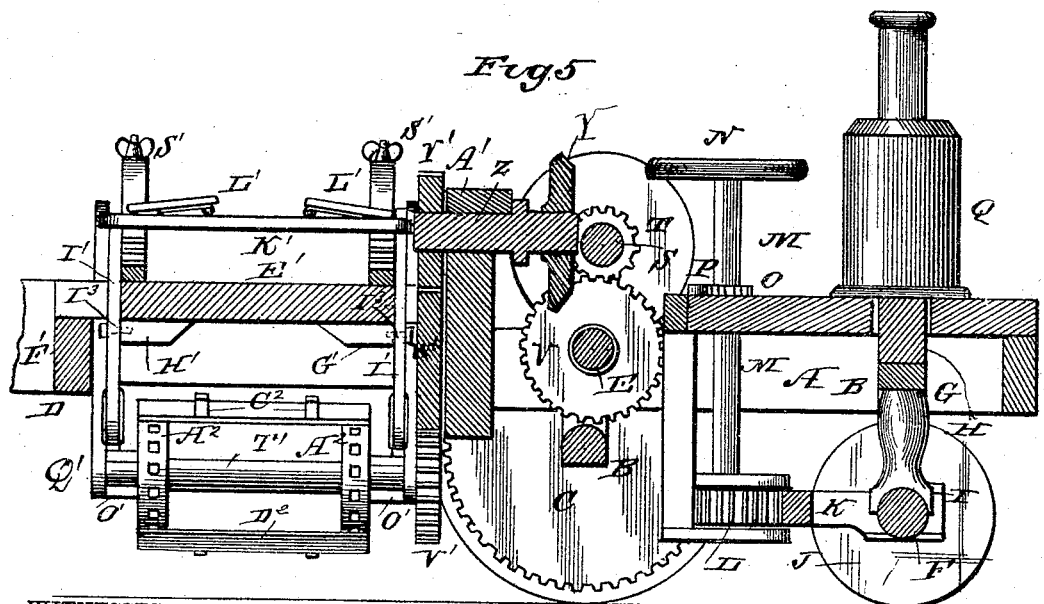
Figure 8:
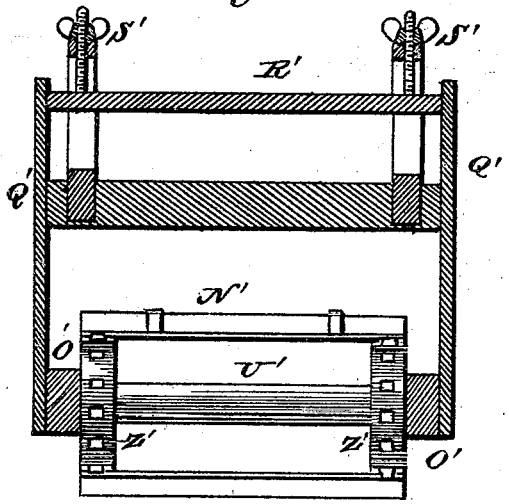
Figure 9:
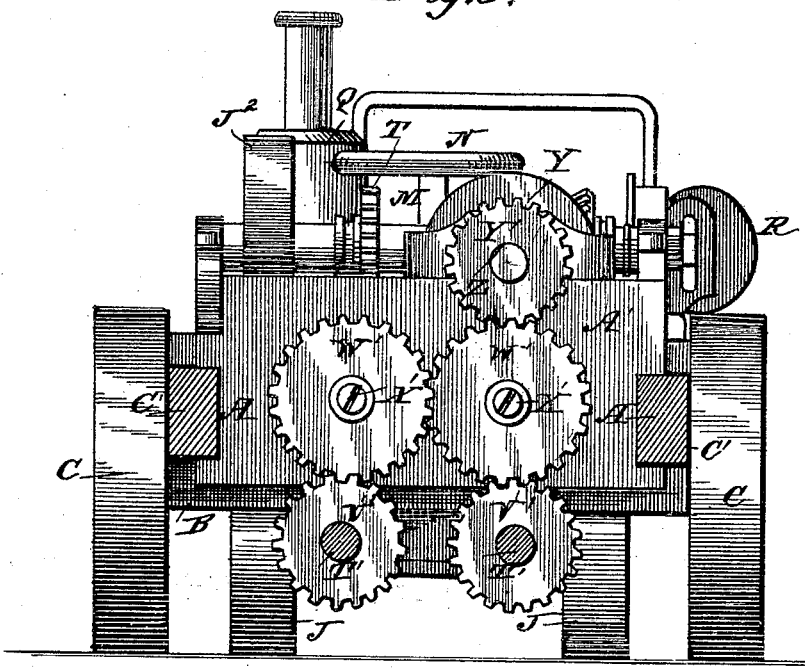

Figure 1 is a plan view of my improved steam road-worker complete. Fig. 2 is a side view of the same. Fig. 3 is a side view taken from the opposite side of the machine. Fig. 4 is a rear elevation. Fig. 5 is a longitudinal vertical sectional view taken on the line $x$ $x$ in Fig. 1. Fig. 6 is a transverse vertical sectional view taken on the line $y$ $y$ in Fig. 1. Fig. 7 is a transverse vertical sectional view taken on the line $z$ $z$ in Fig. 1. Fig. 8 is a sectional view taken on the line $w$ $w$ in Fig. 1, and Fig. 9 is a sectional view taken on the line $v$ $v$ in Fig. 1.

The same letters refer to the same parts in all the figures.

This invention relates to machines for building or constructing roads; and it has for its object to provide a device adapted to be propelled and operated by a steam traction-engine, by means of which a roadway may be smoothed or graded and tamped so as to place it in fit condition for travel, and which machine shall possess superior advantages in point of simplicity, durability, and general efficiency.

With these ends in view the invention consists in the improved construction and combination of parts, which will be hereinafter fully described, and particularly pointed out in the claims.

In the accompanying drawings, the letter A indicates the frame of the traction-engine, which is mounted upon the axle B, having the traction-wheels C C, which are interiorly toothed and mesh with pinions D D upon the main shaft E, which is journaled transversely in the frame.

F is the axle for the steering-wheels J, which axle is journaled in the lower ends, I, of a yoke, G, provided with the king or pivot bolt H, upon which the steering-truck is swiveled under the machine-frame, and the yoke G has a cogged segment, K, engaged by a pinion, L, secured upon the steering-shaft M, which has a hand-wheel, N, at its upper end, and a ratchet-wheel, O, at its bearing in the frame, which wheel is engaged by a pawl, P, for retaining the shaft in its adjusted position.

Q is the boiler, and R the engine, which imparts motion to a shaft, S, journaled transversely upon the frame, having a sliding pinion, T, which may be thrown in or out of engagement with a cog-wheel, V, upon the main shaft E, by means of a hand-lever, U, and having a bevel-pinion, W, which may be brought into or out of engagement with a bevel-wheel, Y, upon the forward end of a shaft, Z, journaled longitudinally in a bearing upon the rear cross-beam, A′, of the engine-frame.

The side beams, B′ B′, of the frame A are provided at their rear ends with means for the attachment of the longitudinal frame-beams C′ C′ of the frame D′ of the road-worker proper. The construction and operation of the latter I shall now proceed to describe.

E′ designates a table or platform mounted transversely upon the beams C′ C′, the rear ends of which are connected by a cross-beam, F′. The front and rear sides of the said table are provided with brackets G′ H′ G′ H′, (see Fig. 5,) secured underneath the said table, and having bolts or pins I³, upon which are pivoted two pairs of levers, I′ J′ I′ J′, which are connected in pairs above the table or platform by longitudinal connecting pieces or handles K′ K′, the ends of which are provided with suitably-constructed spring-latches L′, engaging segmental racks M′ upon the upper side of the table or platform, whereby the said connecting pieces or handles and the levers may be securely retained in any position to which they may be adjusted.

N′ N′ designate a pair of transverse horizontal frames consisting of side pieces, O′, connected by braces P′. The inner ends of the said frames are suitably hinged to the lower ends of the levers I′ J′, as shown. The outer ends of the frames are provided with hinged upwardly-extending rods or arms Q′, the upper ends of which are connected by bars R', adjustable in vertically-slotted boxes upon the upper side of the table or platform by means of set-screws S', whereby the outer ends of the frames N' may be raised or lowered to any desired extent.

The inner and outer ends of the side pieces of the frames N' are provided with bearings for shafts T' U', the inner ones of which, T', are provided at their front ends with spur-wheels V', engaging or meshing with pinions W', mounted or journaled upon stub-axles X', upon the rear end of the frame of the traction-engine, and meshing together, as shown. One of the pinions W' meshes with a spur-wheel, Y', upon the rear end of the shaft Z of the traction-engine, from which motion may thus be communicated to the road-working mechanism.

The shafts T' and U' of the frames N' are provided with sprocket-wheels Z', supporting the chains $A^2$, for the additional support of which additional idle sprocket-wheels may, when desired, be provided. The chains $A^2$ of each frame are connected by cross-pieces $B^2$, some of which carry plows or cutters $C^2$ of suitable construction, while others are equipped with blades or scrapers $D^2$, the functions of which will be readily understood.

The rear end or cross-beam F' of the frame of the road-worker proper is provided with bearings for a pair of vertically-sliding tampers, $E^2$, arranged to be operated by the action of cams $F^2$ upon a suitably-arranged transverse shaft, $G^2$. The latter is provided with a band wheel or pulley, $H^2$, connected by a belt or band, $I^2$, with a wheel, $J^2$, upon the shaft S of the traction-engine, from which motion may thus be communicated to the shaft $G^2$.

While two tampers, arranged nearly centrally upon the frame, will usually be found sufficient, it will of course be understood that their number and location may be changed at pleasure without departing from the spirit of my invention.

The operation of this invention and its advantages will be readily understood from the foregoing description, taken in connection with the drawings hereto annexed.

The traction-engine may be used independently, when so desired, by simply detaching it from the frame of the road-worker proper. When the latter is connected with the traction-engine, its operating mechanism may be readily thrown into or out of gear, as the case may require, by simply placing the pinion W in or out of engagement with the bevel-wheel Y.

By means of the adjusting mechanism herein described the frames N' N' may be easily moved together or apart, so as to suit the width of the road which is being worked upon, and their outer ends may be raised or lowered, so as to give any desired inclination to the sides of the roadway.

The plows, mounted upon the carrying-chains, will stir and loosen the dirt, which is conveyed by the scrapers to the center of the roadway, where it is firmly tamped by the vertically-reciprocating tampers. The scrapers also serve to smooth the road, leaving it in good condition for traffic.

It will be easily understood that with regard to the construction of details this invention is susceptible of numerous modifications, and I desire to have it understood that I reserve to myself the right to all such changes as may be resorted to without departing from the spirit of my invention.

Having thus described my invention, I claim and desire to secure by Letters Patent of the United States—

1. In a road-working machine, the combination, with a table or platform, of a pair of frames secured under the same, to be adjusted laterally, carrying endless belts having plows and scrapers, as and for the purpose shown and set forth.

2. In a road-working machine, levers pivoted to the front and rear sides of the table or platform, in combination with frames hinged to the lower ends of the said levers, and mechanism for supporting the outer ends of the said frames adjustably, substantially as and for the purpose set forth.

3. In a road-working machine, the combination of a table or platform, levers pivoted to the front and rear sides of the same, cross-pieces or handles connecting the upper ends of the said levers, suitable latch mechanism for retaining the said handles and levers in any position to which they may be adjusted, frames hinged to the lower ends of the said levers, and mechanism for supporting the outer ends of the said frames adjustably, substantially as and for the purpose set forth.

4. In a road-working machine, the combination, with a table or platform, of the operating-frames arranged transversely underneath the same, mechanism for moving the said frames together or apart and for retaining them securely in any position to which they may be adjusted, and mechanism for vertically adjusting and retaining the outer ends of the said frames, substantially as and for the purpose set forth.

5. In a road-working machine, the combination of a table or platform, levers pivoted to the front and rear sides of the same, frames hinged to the lower ends of the said levers, upwardly-extending arms pivoted to the outer ends of the said frames, cross-bars connecting the upper ends of the said arms and sliding in vertically-slotted standards upon the ends of the table or platform, and suitable adjusting-screws working in the upper ends of the said standards, substantially as and for the purpose set forth.

6. In a road-working machine, the combination of a table or platform, the transverse adjustable frames arranged underneath the same, substantially as described, and provided at their ends with shafts having chain or sprocket wheels, the chains provided with cross-bars carrying plows and scrapers, and operating mechanism whereby the said chains shall be caused to travel in opposite directions toward the center of the table or frame, substantially as and for the purpose set forth.

7. In a road-working machine, the combination, with a table or platform attached to a traction-engine and carrying adjustable frames having the dirt loosening and scraping mechanism, of vertically-reciprocating tampers sliding in suitable bearings upon the rear cross-beam of the said table or platform, a transverse shaft having cams adapted to operate the said tampers, and a belt or band connecting the said transverse shaft with a band-wheel upon the main shaft of the traction-engine, substantially as and for the purpose set forth.

In testimony that I claim the foregoing as my own I have hereunto affixed my signature in presence of two witnesses.

WILLIAM DAWSON YEAGER.

Witnesses:
WILLIAM ABRAM WRIGHT,
R. M. TENCH.